United States Patent [19]
Rauhut et al.

[11] 3,974,086
[45] Aug. 10, 1976

[54] STABILIZATION OF HYDROGEN PEROXIDE SOLUTIONS

[75] Inventors: Michael McKay Rauhut, Bridgewater Township, Somerville County; Andrew Milo Semsel, Branchburg Township, Somerset County, both of N.J.

[73] Assignee: American Cyanamid Company, Stamford, Conn.

[22] Filed: May 10, 1974

[21] Appl. No.: 468,843

Related U.S. Application Data

[63] Continuation of Ser. No. 250,221, May 4, 1972, abandoned.

[52] U.S. Cl.......................... 252/188.3 CL; 252/186; 252/404; 252/301.16
[51] Int. Cl.² ......................................... C09K 11/06
[58] Field of Search .......... 252/188.3 CL, 186, 404, 252/301.2; 240/2.25; 423/272, 273, 584; 260/610 A

[56] References Cited
UNITED STATES PATENTS

| | | | |
|---|---|---|---|
| 3,597,362 | 8/1971 | Bollyky et al. | 252/188.3 CL |
| 3,691,085 | 9/1972 | Roberts et al. | 252/188.3 CL |
| 3,869,401 | 3/1975 | Ernst et al. | 423/272 |

*Primary Examiner*—Benjamin R. Padgett
*Assistant Examiner*—Irwin Gluck
*Attorney, Agent, or Firm*—Charles J. Fickey; Gordon L. Hart

[57] ABSTRACT

Method for improving the storage stability of oxalic ester chemiluminescent light system components by the addition of certain additive compounds to either the oxalic ester component or the hydrogen peroxide component or both.

2 Claims, No Drawings

STABILIZATION OF HYDROGEN PEROXIDE SOLUTIONS

This is a continuation of copending application Ser. No. 250,221 filed May 4, 1972 and now abandoned.

This invention relates to the stabilization of hydrogen peroxide or oxalic ester solutions. More particularly, it relates to a 2-component, oxalic ester chemical lighting system having improved storage stability.

The oxalic ester chemical lighting system is described in U.S. Pat. No. 3,597,362, and generally has at least two separate components: (1) a bisester of oxalic acid and a fluorescer in an organic solvent and (2) hydrogen peroxide in an organic solvent.

The oxalate and hydrogen peroxide solutions inherently decompose during storage and thus have a limited shelf life. Many chemical light formulations require a hydrogen peroxide solution as an activator component. Chemical light formulations are particularly useful in emergency lighting applications. In such applications, the system must operate effectively when required. Because of the gradual decomposition of the component solutions used in chemical light formulations, the shelf life of emergency lighting systems can be inadequate. The decomposition is an even greater problem at higher temperatures. This is very critical since the compositions are very likely to be submitted to elevated temperatures at some time during storage, e.g. in sunlight, in automobile glove compartments, and the like. Therefore, a method for stabilizing the oxalate and hydrogen peroxide solutions of chemical light formulations, is highly desirable.

A method has now been discovered for stabilizing the hydrogen peroxide solutions. The method permits the preparation of chemical light formulations having an extended shelf life, i.e., a greater storage stability. The method is particularly useful in 2-component, oxalic ester chemical lighting systems. Such systems are described in U.S. Pat. No. 3,597,362.

In this invention, solutions of oxalate esters or hydrogen peroxide are stabilized by the addition of a relatively minor amount of a phenolic antioxidant as in Formula I.

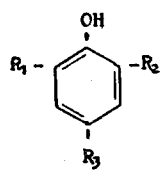

wherein $R_1$ and $R_2$ are tertiary alkyl groups of 4 to 12 carbons and $R_3$ is a normal, secondary or tertiary alkyl group of 1 to 12 carbons. Representative phenols of Formula I include 2,4,6-tri-tert.butylphenol, 2,6-di-tert.butyl-4-methylphenol, 2,6-di-tert.butyl-4-n-butylphenol, 2,6-di-tert.butyl-4-nonylphenol, 2,6-di-tert.butyl-4-dodecylphenol, 2,6-di-tert.butyl-4-isoctylphenol, 2,6-di-tert.butyl-4-(1,1,4-trimethylpentyl)phenol, 2,6-di-tert.butyl-4-isopropylphenol, and 2,4,6-tri-(1,1-dimethylpentyl)phenol. Mixtures of phenols may be used.

The phenolic antioxidant is believed to act as a free radical chain inhibitor to prevent degradation reactions. It has, moreover, been found to be particularly effective at elevated temperatures, the effectiveness increasing with increasing temperature. This was clearly not predictable. Thus, the phenolic additive is an excellent additive for the storage stabilization of the chemiluminescent component solutions.

Although the stabilization of solutions of hydrogen peroxide and water is of general interest, the stabilization of solutions of hydrogen peroxide in organic solvents is of special interest in the field of chemical light. This is also true of the stabilization of oxalate esters. The organic solvent can be any organic fluid which is unreactive toward the hydrogen peroxide, oxalate, or fluorescer and which accommodates a solubility of at least 0.01 molar hydrogen peroxide. The organic solvents include alcohols, preferably tertiary alcohols, such as tertiary butyl alcohol, 3-methyl-3-pentanol, 3,6-dimethyl-3-octanol, etc., and esters such as ethyl acetate, ethyl benzoate, dimethyl phthalate, dioctyl phthalate, propyl formate, etc. Combinations of solvents can also be used. The hydrogen peroxide concentration can range from about 15 molar down to about $10^{-5}$ molar, preferably about 3 molar down to about $10^{-1}$ molar.

As stated above, this invention is especially useful in oxalic ester chemical lighting systems. The preferred type of oxalic esters includes bis(substituted phenyl)oxalates, such as those listed in U.S. Pat. No. 3,597,362 and the preferred oxalates are bis(2,4,5-trichloro-6-carbobutoxyphenyl) oxalate and bis(2,4,5-trichloro-6-carbopentoxyphenyl) oxalate of copending, commonly assigned U.S. patent application Ser. No. 124,142, filed Mar. 15, 1971.

A fluorescent compound is used in the chemical lighting system, as previously described. Fluorescent compounds of use in the oxalic ester systems are defined in U.S. Pat. No. 3,597,362. A preferred fluorescer is 9,10-bis(phenylethynyl)-anthracene as disclosed in U.S. Pat. No. 3,557,223.

Accelerators such as sodium salicylate may also be added to the system to control rate of light output. Such additives are disclosed in copending, commonly assigned U.S. patent application Ser. No. 813,864, filed Apr. 7, 1969.

The following specific examples illustrate certain embodiments and modes of practice of the invention and are not intended to be limitative.

EXAMPLE 1

The effect of 2,4,6-tri-tert.butylphenol on the stability of hydrogen peroxide was measured by preparing two activator components (A and B) containing hydrogen peroxide. One of the activator components (B) also contained 2,4,6-tri-tert.butylphenol. The two activator components were stored at 75°C. in Teflon FEP bottles, and the activity of the hydrogen peroxide was monitored at intervals by determining the intensity of light emission in a chemiluminescent reaction. Since the activity of the activator component is dependent on the concentration of hydrogen peroxide in the activator component, the light intensity measurements also indicate the relative concentrations of hydrogen peroxide in the two activator components.

Activator Component A

A solution of hydrogen peroxide (1.5 molar) and sodium salicylate (0.001 molar) in a solvent mixture of 80% (by volume) dimethyl phthalate and 20% tertiary butyl alcohol.

Activator Component B

A solution of hydrogen peroxide (1.5 molar), sodium salicylate (0.001 molar) and 2,4,6-tri-tert.butylphenol (0.004 molar) in a solvent mixture of 80% dimethyl phthalate and 20% tertiary butyl alcohol.

The activities of the activator components were determined at intervals during the storage period by combining, at 25°C., 1.0 ml of activator component with 3.0 ml of an oxalate component consisting of a solution of bis(2,4,5-trichloro-6-carbobutoxyphenyl) oxalate (TCCPO) (1.20 molar) and 9,10-bis(phenylethynyl)anthracene (0.003 molar) in dibutyl phthalate.

Absolute quantum yields, light capacities, life times and light intensity-time distribution characteristics were measured by using instrumentation and experimental techniques described by B. G. Roberts and R. C. Hirt, *Applied Spect.* 21, 250 (1967). The results are shown in Table I.

The maximum storage period which can be achieved before the hydrogen peroxide concentration decreases below a limiting concentration of about 0.4 M required for adequate chemical light performance was determined from the data in the table. The Activator Component A, which did not contain 2,4,6-tri-tert.butylphenol, failed between 60 and 90 days of storage, while Activator Component B which did contain the stabilizer, continued to give satisfactory performance even after 120 days of storage. Thus, the hydrogen peroxide in the activator component containing the tri-tert.butylphenol had been substantially stabilized.

EXAMPLE 2

In this example, the storage stability at 75°C. (about 167°F.) of a chemiluminescent light system was tested. The system consisted of two concentric, cylindrical containers, the outer being plastic and the inner glass. The activator solution (hydrogen peroxide component) was sealed in the glass container which was placed in the plastic container and the remaining space contained the oxalate-fluorescer solution. This device is disclosed in U.S. Pat. No. 3,576,987.

The activator solution consisted of a solution of 1.5 M hydrogen peroxide and $6.25 \times 10^{-4}$ M sodium salicylate in a solvent mixture comprising 80 volumn percent dimethyl phthalate and 20% t-butyl alcohol. The oxalate solution consisted of a solution of 0.133 M bis(2,4,5-trichloro-6-carbopentoxyphenyl)oxalate [CPPO] and $3 \times 10^{-3}$ M 9,10-bis-(phenylethynylanthracene [BPEA] in dibutyl phthalate. In the device of Table II, 2.4 ml of activator solution and 7.5 ml. of oxalate solution were used. In the device of Table III, 1.0 ml. of activator solution and 3.0 ml. of oxalate solution were used.

After a number of days storage, the device was operated to admix the solutions and obtain light. The storage times and effect of none, and varying amounts of a phenolic antioxidant, namely 2,4,6-tri-tert.butylphenol (TBP), in the oxalate component are illustrated in Tables II, III and IV.

Plastic U. C. 180 (Table II) is a low density polyethylene of Union Carbide Co. (Natural 7-D.N.D.A.-0180NT-7).

Alethon 2020 (Table III) is a low density polyethylene of E. E. DuPont de Nemours Co.

TABLE I

| Days Stored | Intensity (ft. lbt. cm$^{-1}$)vs. Time | | | | | Lifetime[a] to ¾ (min.) | Quantum Yield[b] ($10^2$ cin. mole$^{-1}$) | Light Capacity[c] (lm. hr. liter$^{-1}$) |
|---|---|---|---|---|---|---|---|---|
| | 2min. | 10min. | 30min. | 60min. | 120min. | | | |
| Activator Component A (No Stabilizer Present) | | | | | | | | |
| 0 | 39.8 | 30.1 | 18.7 | 8.8 | 1.9 | 53.9 | 9.65 | 265.0 |
| 30 | 36.4 | 18.9 | 12.5 | 8.2 | 3.8 | 106.8 | 9.67 | 265.7 |
| 60 | 40.5 | 21.9 | 13.2 | 7.9 | 3.5 | 98.1 | 9.47 | 260.1 |
| 90 | 5.1 | 7.5 | 6.8 | 5.3 | 2.7 | 151.5 | 5.57 | 153.1 |
| Activator Component B (Stabilizer Present) | | | | | | | | |
| 0 | 44.6 | 37.6 | 23.4 | 6.0 | 0.7 | 36.8 | 8.95 | 273.3 |
| 30 | 59.9 | 31.6 | 18.6 | 8.3 | 0.2 | 55.6 | 9.37 | 285.9 |
| 60 | 49.2 | 28.5 | 17.6 | 10.4 | 3.4 | 76.5 | 10.10 | 308.4 |
| 90 | 61.2 | 31.6 | 16.2 | 7.9 | 1.8 | 72.7 | 9.60 | 293.0 |
| 120 | 80.9 | 18.9 | 10.5 | 5.8 | 2.5 | 94.7 | 6.60 | 201.4 |

[a]Time required for ¾ of total light emission.
[b]Based on the initial TCCPO concentration.
[c]Integrated light output per unit volume.

TABLE II

6" LIGHTSTICK STORAGE STABILITY STUDIES AT 75°C.
($6.25 \times 10^{-4}$ M NaSal.)

| Plastic | TBP Conc. $10^{-3}$M. | Storage Time (days) | Brightness (Ft. Lbts. cm$^{-1}$) vs. Time (min.) | | | | | | | Lt. Cap. (lm. hr. l$^{-1}$) |
|---|---|---|---|---|---|---|---|---|---|---|
| | | | 2 | 10 | 30 | 60 | 90 | 120 | 180 | |
| — | 0 | 0 | 19 | 16 | 14 | 9.1 | 5.9 | 4.1 | NA | 249 |
| U.C. −180 | 0 | 35 | 14 | 8.0 | 7.1 | 5.8 | 4.1 | 2.8 | 1.5 | 127 |
| " | 0 | 66 | 17 | 11 | 8.7 | 5.8 | 3.0 | 1.8 | 0.2 | 144 |
| " | 1 | 35 | 19 | 15 | 14 | 12 | 8.0 | 5.1 | 1.9 | 271 |
| " | 1 | 66 | 17 | 13 | 13 | 11 | 6.4 | 4.0 | 1.8 | 244 |
| " | 1 | 90 | 16 | 11 | 10 | 9.1 | 6.9 | 4.8 | 2.4 | 238 |
| " | 2 | 0 | 30 | 20 | 15 | 9.7 | 6.0 | 4.2 | 2.0 | 270 |
| " | 2 | 48 | 24 | 20 | 20 | 10 | 5.0 | 2.7 | 1.1 | 250 |
| " | 2 | 48 | 20 | 16 | 14 | 7.0 | 3.5 | 2.1 | 1.0 | 185 |
| " | 5 | 0 | 19 | 15 | 13 | 10 | 8.1 | 5.6 | 1.7 | 268 |
| " | 5 | 0 | 21 | 16 | 14 | 11 | 8.4 | 5.7 | 1.8 | 287 |
| " | 5 | 48 | 21 | 16 | 15 | 7.5 | 3.8 | 2.2 | 1.1 | 192 |

TABLE II-continued

6" LIGHTSTICK STORAGE STABILITY STUDIES AT 75°C.
($6.25 \times 10^{-4}$ M NaSal.)

| Plastic | TBP Conc. $10^{-3}$M. | Storage Time (days) | Brightness (Ft. Lbts. cm$^{-1}$) vs. Time (min.) | | | | | | | Lt. Cap. (lm. hr. l.$^{-1}$) |
|---|---|---|---|---|---|---|---|---|---|---|
| | | | 2 | 10 | 30 | 60 | 90 | 120 | 180 | |
| " | 5 | 48 | 26 | 22 | 21 | 10 | 4.9 | 2.7 | 1.2 | 255 |

TABLE III

4" LIGHTSTICK STORAGE STABILITY STUDIES AT 75°C.
($6.25 \times 10^{-4}$ M NaSal.)

| Plastic | TBP Conc. $10^{-3}$ | Storage Time (days) | Brightness (Ft. Lbts. cm$^{-1}$) vs. Time (min.) | | | | | | | Lt. Cap. (lm. hr. l.$^{-1}$) |
|---|---|---|---|---|---|---|---|---|---|---|
| | | | 2 | 10 | 30 | 60 | 90 | 120 | 180 | |
| Alethon 2020 | 0 | 0 | 26 | 23 | 18 | 12 | 7.0 | 4.5 | 2.0 | 312 |
| " | 0 | 30 | 5 | 4.4 | 7.5 | 5 | 4.4 | 3.7 | 2 | 151 |
| " | 0 | 30 | 13 | 9 | 2 | 6 | 4.4 | 3.2 | 1.5 | 167 |
| " | 1 | 0 | 29 | 25 | 20 | 13 | 7.2 | 4.5 | 2.0 | 328 |
| " | 1 | 0 | 31 | 26 | 20 | 13 | 7.4 | 4.6 | 1.8 | 329 |
| " | 1 | 30 | 5.2 | 5.1 | 6.2 | 7.3 | 8.5 | 7.6 | 3.1 | 223 |
| " | 1 Crude | 0 | 28 | 23 | 19 | 13 | 7.5 | 4.6 | 1.8 | 318 |
| " | 1 Crude | 0 | 28 | 23 | 20 | 13 | 7.2 | 4.3 | 1.6 | 310 |
| " | 1 Crude | 30 | 5.2 | 5.2 | 7.4 | 8.9 | 8.9 | 7.7 | 3.1 | 238 |
| " | 2 | 0 | 30 | 20 | 15 | 9.7 | 6.0 | 4.2 | 2.0 | 270 |
| " | 2 | 35 | 4.2 | 3.9 | 5.3 | 6.0 | 5.8 | 5.2 | — | 168 |

EXAMPLE 3

In Tables IV and V are shown the results of storage tests of the oxalate component having an improved fluorescer compound, namely 1,8-dichloro-9,10-bis(-phenylethynyl)anthracene. This improved fluorescer is further disclosed in U.S. Pat. No. 3,888,786.

DBPC gave best stabilization results. The storage stability tests were made with TBP, DBPC and DMBP.

1. Stored oxalate components contained 0.28M bis(2,4,5-trichloro-6-carbopentoxyphenyl)oxalate(CPPO), $7.5 \times 10^{-3}$M 1,8-dichloro-9,10-bis(phenylethynyl)anthracene(1,8-DCBPEA) in dibutyl phthalate.

2. Chemiluminescent reactions contained 0.21M CPPO, $5.6 \times 10^{-3}$M 1,8-DCBPEA, 0.375M $H_2O_2$ and the indicated concentrations of sodium salicylate (NaSal) in a solvent mixture of 75% dibutylphthalate, 20% dimethyl phthalate, 5% t-butanol.

3. Antioxidants used: 2,4,6-tri-t-butylphenol (TBP), 2,6-di-t-butyl-p-cresol (DBPC) and 2,4-dimethyl-6-t-butylphenol (DMBP). Concentrations are in the stored oxalate component.

4. Light capacity in lumen hours per liter.
5. Quantum Yield in einsteins per mole.
6. Time required for emission of 75% of the total amount of light.

TABLE IV

Storage Stability of Oxalate Components Containing 1,8-DCPEA at 75°C in Teflon FEP[1,2]

| Antioxidant[3] | Conc$_3$ M×10$^3$ | NaSal. M×10$^4$ | Days Stored at 75° | % 1.8-DCBPEA left | % of initial Lt. Cap. | Lt. Cap[4] | Q.Y.[5] X10$^2$ | T3/4[6] | Intensity (Ft.Lmbts in$^{-10}$) vs. Time (min.) | | | | | | |
|---|---|---|---|---|---|---|---|---|---|---|---|---|---|---|---|
| | | | | | | | | | 2 | 10 | 30 | 60 | 120 | 180 | 240 |
| None | | 3 | 0 | | | 477 | 7.94 | 90 | 74.7 | 44.2 | 23.5 | 13.2 | 6.4 | 3.4 | 1.7 |
| | | | 7 | 60 | 57 | 270 | 4.50 | 81 | 45.6 | 28.2 | 15.2 | 8.1 | 3.2 | 1.5 | 0.6 |
| | | | 14 | 35 | 27 | 129 | 2.14 | 62 | 23.1 | 14.9 | 7.9 | 4.0 | 1.2 | 0.4 | 0.1 |
| | | | 21 | <15 | 14 | 65 | 1.08 | 34 | 19.6 | 10.8 | 3.8 | 1.3 | 0.2 | 0.1 | — |
| TBP | 5 | 5 | 0 | | | 456 | 7.58 | 93 | 62.4 | 47.4 | 25.7 | 13.8 | 4.9 | 2.1 | 1.2 |
| | | | 7 | 80 | 88 | 400 | 6.66 | 59 | 80.0 | 52.0 | 24.3 | 9.1 | 2.4 | 1.2 | 0.8 |
| | | | 14 | 58 | 66 | 297 | 4.94 | 56 | 59.1 | 40.1 | 18.6 | 6.4 | 1.7 | 0.8 | 0.5 |
| | | | 21 | 41 | 45 | 207 | 3.45 | 48 | 46.1 | 30.0 | 12.9 | 4.7 | 1.2 | 0.5 | 0.3 |
| | | | 28 | 29 | 33 | 149 | 2.48 | 64 | 25.4 | 18.0 | 9.3 | 4.3 | 1.2 | 0.4 | 0.3 |
| | | | 35 | 24 | 24 | 111 | 1.84 | 41 | 26.5 | 17.7 | 6.9 | 2.3 | 0.6 | 0.2 | 0.2 |
| | | | 60 | 12 | 10 | 45 | 0.76 | 30 | 13.4 | 8.6 | 2.4 | 0.7 | 0.1 | — | — |
| DEPC | 5 | 5 | 0 | | | 464 | 7.73 | 100 | 55.2 | 42.2 | 27.1 | 14.6 | 4.9 | 2.2 | 1.3 |
| | | | 7 | 79 | 93 | 433 | 7.21 | 57 | 80.3 | 58.0 | 28.0 | 9.8 | 2.6 | 1.2 | 0.8 |
| | | | 14 | 65 | 78 | 364 | 6.06 | 57 | 68.7 | 49.2 | 23.2 | 7.7 | 2.0 | 1.0 | 0.6 |
| | | | 21 | 49 | 70 | 327 | 5.44 | 51 | 68.0 | 46.9 | 19.9 | 7.2 | 1.9 | 0.9 | 0.5 |
| | | | 28 | 48 | 60 | 277 | 4.61 | 68 | 44.5 | 32.3 | 17.4 | 8.0 | 2.3 | 0.9 | 0.5 |
| | | | 35 | 40 | 58 | 267 | 4.44 | 48 | 55.3 | 39.7 | 16.4 | 5.9 | 1.6 | 0.7 | 0.4 |
| | | | 60 | 32 | 47 | 219 | 3.65 | 37 | 57.1 | 39.2 | 12.1 | 3.8 | 0.9 | 0.4 | 0.2 |
| DMBP | 5 | 5 | 0 | | | 434 | 7.23 | 124 | 38.7 | 28.8 | 21.8 | 15.6 | 6.3 | 2.8 | 1.5 |
| | | | 7 | 82 | 91 | 396 | 6.59 | 66 | 53.3 | 42.8 | 28.7 | 12.1 | 3.0 | 1.3 | 0.7 |
| | | | 14 | 68 | 79 | 344 | 5.72 | 61 | 49.3 | 39.4 | 25.9 | 9.6 | 2.3 | 1.0 | 0.6 |
| | | | 21 | 53 | 73 | 318 | 5.29 | 65 | 46.6 | 36.7 | 22.0 | 8.7 | 2.2 | 0.9 | 0.5 |
| | | | 28 | 53 | 60 | 261 | 4.35 | 78 | 31.1 | 23.9 | 17.5 | 9.1 | 2.6 | 1.0 | 0.5 |
| | | | 35 | 39 | 64 | 233 | 3.89 | 55 | 37.2 | 30.7 | 16.2 | 6.2 | 1.7 | 0.7 | 0.3 |
| | | | 60 | 30 | 43 | 188 | 3.13 | 39 | 38.5 | 33.9 | 11.5 | 3.6 | 0.9 | 0.4 | 0.2 |

Notes to TABLE IV

TABLE V

Storage Stability of Oxalate Components Containing 1,8-DCBPEA at 75°C. in Teflon FEP[1,2]

| Additive | Days Stored at 75°C. | % 48 DCBPEA Left | Lt. Cap. | Q. Y. | T % | 2 | 10 | 30 | 60 | 120 | 180 | 240 | 360 |
|---|---|---|---|---|---|---|---|---|---|---|---|---|---|
| A None | 0 | — | 477[3] | 7.94 | 90 | 74.7 | 44.2 | 23.5 | 13.2 | 6.4 | 3.4 | 1.7 | 0.1 |
| | 7 | 60 | 270 | 4.50 | 81 | 45.6 | 28.2 | 15.2 | 8.1 | 3.2 | 1.5 | 0.6 | 0.2 |
| | 14 | 35 | 129 | 2.14 | 62 | 23.1 | 14.9 | 7.9 | 4.0 | 1.2 | 0.4 | 0.1 | — |
| | 21 | <15[4] | 65 | 1.08 | 34 | 19.6 | 10.8 | 3.8 | 1.3 | 0.2 | 0.1 | — | — |
| B 1 × 10⁻² Mp 0 TBAP | 0 | — | 668[3] | 11.1 | 106 | 72.7 | 43.4 | 25.3 | 15.7 | 8.1 | 4.6 | 2.7 | 1.1 |
| | 7 | 46 | 251 | 4.18 | 101 | 36.0 | 23.4 | 13.0 | 7.3 | 3.2 | 1.7 | 0.9 | 0.3 |
| | 14 | <17[4] | 70 | 1.17 | 73 | 12.0 | 7.5 | 4.0 | 2.2 | 0.7 | 0.3 | 0.1 | — |
| | 21 | < 9[4] | 36 | 0.60 | 47 | 8.5 | 4.8 | 2.3 | 1.0 | 0.2 | 0.1 | — | — |
| C 1 × 10⁻³ M TBP | 0 | — | 497[3] | 8.27 | 83 | 74.7 | 47.5 | 25.1 | 13.9 | 6.4 | 3.2 | 1.5 | — |
| | 7 | 79 | 348 | 5.79 | 99 | 53.3 | 34.2 | 18.2 | 9.7 | 4.4 | 2.4 | 1.3 | 0.3 |
| | 14 | 56 | 224 | 3.73 | 81 | 33.3 | 22.4 | 12.9 | 7.2 | 2.8 | 1.2 | 0.5 | — |
| | 21 | 31 | 149 | 2.48 | 43 | 36.7 | 22.2 | 9.2 | 3.6 | 0.8 | 0.3 | 0.1 | — |
| D 0.4% Polyox WSRN-80 | 0 | — | 599[3] | 9.96 | 164 | 56.8 | 28.3 | 18.0 | 13.6 | 8.5 | 5.8 | 4.1 | 1.9 |
| | 7 | 48 | 266 | 4.43 | 178 | 21.9 | 12.6 | 9.6 | 7.9 | 5.0 | 3.2 | 1.9 | 0.7 |
| | 14 | <22[4] | 103 | 1.73 | 108 | 15.1 | 8.3 | 4.9 | 3.2 | 1.5 | 0.8 | 0.4 | — |
| | 21 | < 9[4] | 37 | 0.62 | 61 | 6.2 | 4.0 | 2.5 | 1.3 | 0.3 | 0.1 | — | — |
| E None, No CPPO | 0 | — | | | | | | | | | | | |
| | 7 | 85 | | | | | | | | | | | |
| | 14 | 68 | | | | | | | | | | | |
| | 21 | 56 | | | | | | | | | | | |

[1]Stored components contained 0.28 M bis(2,4,5-trichloro-6-carbopentoxyphenyl)oxalate (CPPO) and 7.5 × 10⁻³ M 1,8-dichloro-9,10-bis(phenylethynyl)anthracene (1,8-DCBPEA) in dibutyl phthalate.
[2]Chemiluminescent reactions contained 0.21 M CPPO, 5.6 × 10⁻³ M 1,8-DCBPEA, 0.375 M H₂C₂ and 3 × 10⁻⁴ M sodium salicylate in 75% dibutyl phthalate, 20% dimethyl phthalate, 5% t-butanol.
[3]Readings taken every 30 minutes. The 10 and 20 minutes values were interpolated graphically.
[4]By-product absorption contributes substantially to this value.
[5]TBP = 2,4,6-tri-t-butylphenol.
[6]TBAP = Tetrabutylammoniumperchlorate.

We claim:

1. A stabilized component in a chemiluminescent light system said component comprising a solution in organic solvent of a bis-ester of oxalic acid, an organic fluorescent compound and a stabilizing amount of a phenolic antioxidant compound of the formula

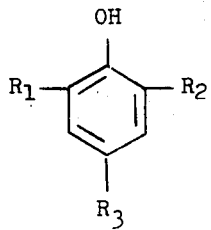

wherein each of $R_1$ and $R_2$ is tertiary alkyl having 4 to 12 carbon atoms and $R_3$ is alkyl having 1 to 12 carbon atoms.

2. In a chemiluminescent light system comprising at least two separate components, a first component consisting of the stabilized component defined by claim 1, and a second component comprising a hydroperoxide and a solvent.

* * * * *

UNITED STATES PATENT AND TRADEMARK OFFICE
CERTIFICATE OF CORRECTION

PATENT NO. : 3,974,086

DATED : August 10, 1976

INVENTOR(S) : Michael McKay Rauhut and Andrew Milo Semsel

It is certified that error appears in the above-identified patent and that said Letters Patent is hereby corrected as shown below:

In Column 1, insert the following statement as the second paragraph of the Specification:

--The invention herein described was made in the course of or under a contract (Contract No. N60921-67-C-0214) or subcontract thereunder, (or grant) with the Department of the Navy.--

Signed and Sealed this

Thirteenth Day of November, 1990

Attest:

HARRY F. MANBECK, JR.

Attesting Officer

Commissioner of Patents and Trademarks